United States Patent [19]

Schumacher et al.

[11] Patent Number: 5,346,230
[45] Date of Patent: Sep. 13, 1994

[54] SEAL FOR A RECIPROCATING ROD

[75] Inventors: Herbert Schumacher, Gorxheimertal; Roland Ehmsen; Werner Trauth, both of Weinheim, all of Fed. Rep. of Germany

[73] Assignee: Firma Carl Freudenberg, Weinheim, Fed. Rep. of Germany

[21] Appl. No.: 32,904

[22] Filed: Mar. 18, 1993

[30] Foreign Application Priority Data

Mar. 31, 1992 [DE] Fed. Rep. of Germany ....... 4210540

[51] Int. Cl.$^5$ ............................................ F16J 15/32
[52] U.S. Cl. ................... 277/152; 277/168; 277/188 R; 277/205
[58] Field of Search ................. 277/37, 152, 153, 168, 277/178, 188 R, 188 A, 205, 207 A

[56] References Cited

U.S. PATENT DOCUMENTS

| | | | |
|---|---|---|---|
| 2,815,973 | 12/1957 | Jackson | 277/188 A |
| 3,236,528 | 2/2966 | Bram | 277/207 A X |
| 3,271,038 | 9/1966 | Bastow | 277/188 R |
| 3,394,939 | 7/1968 | Mastro | 277/188 R X |
| 3,495,843 | 2/1970 | Andersen et al. | 277/153 X |
| 3,856,315 | 12/1974 | Stansbury | 277/207 A X |
| 4,053,166 | 10/1977 | Domkowski | 277/205 X |
| 4,211,152 | 7/1980 | Colletti et al. | 277/153 X |
| 4,300,778 | 11/1981 | Gagne | 277/188 A |
| 4,352,498 | 10/1982 | Burke et al. | 277/188 A X |
| 4,371,177 | 2/1983 | Bähr et al. | 277/152 |
| 4,553,761 | 11/1985 | Blesing et al. | |
| 4,565,380 | 2/1986 | Newman et al. | 277/205 X |
| 4,867,043 | 9/1989 | Antkowiak | 277/205 X |
| 4,893,823 | 1/1990 | Strouse et al. | 277/188 A X |
| 5,163,692 | 11/1992 | Schofield et al. | 277/153 |

FOREIGN PATENT DOCUMENTS

| | | | |
|---|---|---|---|
| 948464 | 8/1956 | Fed. Rep. of Germany | 277/153 |
| 2525724 | 1/1976 | Fed. Rep. of Germany | 277/168 |
| 2905724 | 8/1980 | Fed. Rep. of Germany | 277/153 |
| 3245338 | 6/1984 | Fed. Rep. of Germany . | |
| 3830708 | 3/1990 | Fed. Rep. of Germany | 277/152 |
| 165168 | 6/1992 | Japan | 277/152 |
| 1303779 | 4/1987 | U.S.S.R. | 277/168 |
| 797684 | 7/1958 | United Kingdom | 277/188 A |
| 1041916 | 9/1966 | United Kingdom | 277/188 R |
| 1179702 | 1/1970 | United Kingdom | 277/188 R |
| 1332645 | 10/1973 | United Kingdom | 277/188 A |
| 2029913 | 3/1980 | United Kingdom | 277/205 |

Primary Examiner—William A. Cuchlinski, Jr.
Assistant Examiner—Scott W. Cummings
Attorney, Agent, or Firm—Kenyon & Kenyon

[57] ABSTRACT

A seal for a reciprocating rod, comprised of a sealing ring of elastomeric material, which is provided at its end facing away from the space to be sealed off with a recess that opens towards the rod and in the direction of the end, into which a guide ring is inserted. At a distance from the end, the guide ring is provided with one radially outwardly pointing projection which is snapped into the sealing ring. The sealing ring is undetachably secured to the guide ring during storage and assembly.

9 Claims, 7 Drawing Sheets

SEAL FOR A RECIPROCATING ROD

BACKGROUND OF THE INVENTION

The invention relates generally to seals, and, more particularly to a seal which is capable of being pressurized and which is used for the gap between a reciprocating rod and a housing surrounding the rod. The seal is comprised of a dynamically balanced sealing ring of an elastomeric material, which is capable of being inserted into the housing and which is provided at a pressurized end with at least one sealing lip to engage the rod. At the opposite end, the seal has a recess that opens toward the rod and into which is inserted a guide ring comprising a tough, hard polymer material.

Such a seal is disclosed by the German Patent DE-PS 32 45 338, corresponding to U.S. Pat. No. 4,553,761 to Blesing et al., issued Nov. 19, 1985. The disclosure of U.S. Pat. No. 4,553,761 is hereby incorporated by reference into the present specification. In that prior art seal, a back-up ring 8 consisting of tough, hard plastic has a profile shaped to fit in a recess of a sealing ring S. The back-up ring 8 is made available to the user independently of the actual sealing ring, thus making it more difficult to assemble such a seal.

SUMMARY OF THE INVENTION

An object of the present invention is to develop further such a seal so as to facilitate storage and assembly.

The back-up or auxiliary ring of the present invention is designed as a guide ring and is provided with at least one radially outwardly pointing projection which is capable of being snapped into place in a recess of a sealing ring. The invention also provides for the sealing ring to be compressed radially during normal operational use between the guide ring and a housing. By the projection of the guide ring and the corresponding portion of the sealing ring, the sealing ring and the guide ring are undetachably affixed to one another during transport and assembly, thus considerably simplifying the application of the seal according to the invention.

The housing and the guide ring can be made of material which is essentially inflexible; the sealing ring can comprise an essentially incompressible elastomer material. The radial compression of the sealing ring between the housing and the guide ring results on the one hand in an excellent, long-lasting seal between the sealing ring and the housing and, on the other hand, in a precise alignment of the guide ring relative to the housing. This arrangement also provides a long service life.

The sealing ring may have an annular projection such as a shoulder that extends radially outward. This aids in attaining a reliable compression of a retaining section of the sealing ring between the housing and the guide ring.

Another embodiment provides for the retaining section of the sealing ring and the remaining portions of sealing ring (including the sealing lip) to be coupled by an intermediate contracted portion. The contracted portion maintains the radial mobility of the portion of the seal which is in engagement with the rod, despite the forceful compression of the retaining section between the housing and the guide ring. It turns out that the sealing attained with the seal according to this embodiment is, therefore, also maintained when the rod is subjected to a canting strain, produced for example by forces introduced at an angle. The intermediate contracted portion is formed by a contracted neck portion in the profile of the sealing ring.

If the retaining section is provided with a radially outwardly pointing annular projection, the housing can be provided with a corresponding groove or shoulder whose profile conforms to the annular projection. With such a design, one attains an axial stabilization of the annular projection and, thus, of the sealing ring in the accommodating housing.

The retaining section can be retained in the housing by an inwardly projecting flange portion of the housing. The flange projection also can retain the guide ring, by at least partially engaging its outer surface. This makes possible a precise alignment between the sealing ring and the guide ring. The flange projection can consist of a flanged section of the inner wall of the housing, which simplifies its manufacture in mass production.

The diameter of the radially outwardly pointing projection of the guide ring can increase uniformly with increasing distance from its end, in order to prevent the development of internal preloading in the area of the dynamic sealing lips of the sealing ring. This also results in an especially precise alignment of the guide ring in relation to the surrounding housing.

The retaining section of the sealing ring which is compressed between the housing and the guide ring can be allowed to expand in a direction parallel to the rod. Thus, relaxation, which could result in failure, is prevented.

The seal according to the invention is suited for sealing off reciprocating rods from a pneumatic and hydraulic region. Preferred applications are found in gas-filled springs and shock absorbers.

The subject matter of the invention will be clarified in further detail with reference to the drawings.

DETAILED DESCRIPTION OF THE PREFERRED EMBODIMENTS

Figure 1:
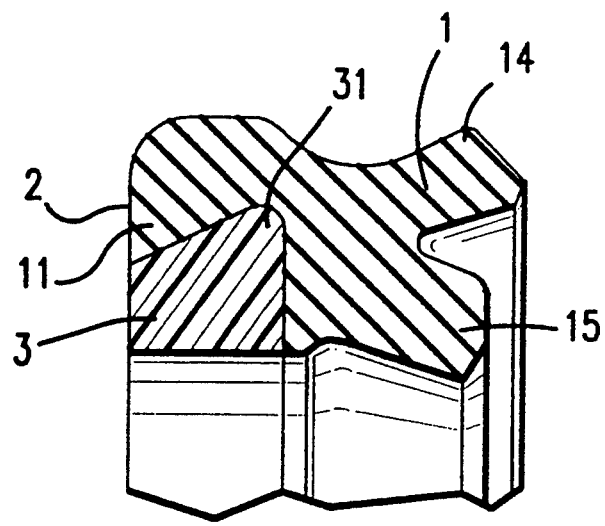
FIG. 1 shows a partial cross-sectional view of a seal according to the present invention.

FIG. 1 shows in partial cross-section an embodiment of the seal of the present invention in its condition at the time of supply to a user. The seal is intended to be used to seal a gap between a reciprocating rod and a surrounding housing. The seal comprises a dynamically balanced sealing ring 1 of elastomeric material, and a guide ring 3 of a tough, polymer material.

At one end the sealing ring 1 is to seal off a medium 4 of a higher pressure. At this end, the sealing ring 1 is provided with at least one sealing lip 15 which is intended to be positioned against a rod. At the opposite end 2, the sealing ring 1 has a recess that opens toward the rod and into which is inserted the guide ring 3.

The guide ring 3 is provided with a radially outwardly pointing projection 31 at a position away from the end 2. This projection 31 is designed to be snapped into place in the recess of the sealing ring 1. The sealing ring 1 has a retaining section 11, which is compressed radially during normal operational use between the guide ring 3 and a housing 6 (not shown in FIG. 1).

Figure 2:
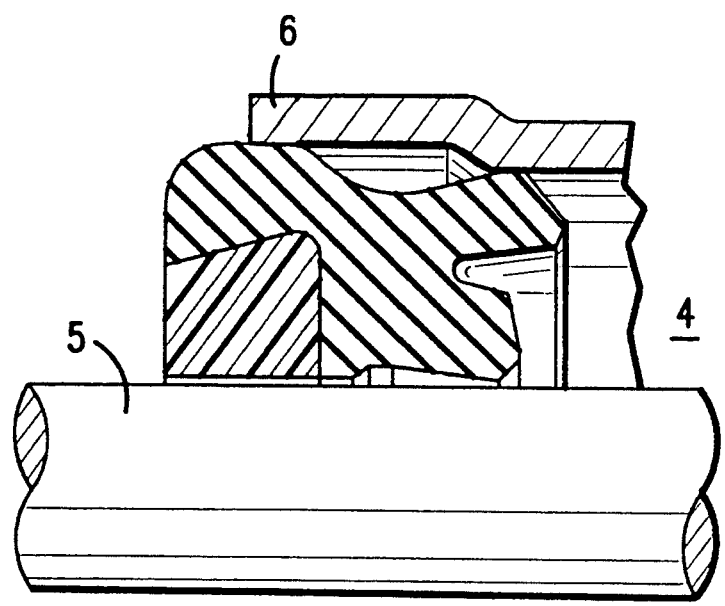
FIG. 2 shows the seal of FIG. 1 being inserted between a housing and a rod.

FIG. 2 shows how the seal of FIG. 1 is inserted into the gap to be sealed, between a housing 6 and a rod 5. The rod 5 is supported in the housing 6 and is able to move back and forth, parallel to the axis of the housing. The housing 6 consists of a sheet steel pipe, which is widened toward the opening into which the seal is inserted.

Figure 3:
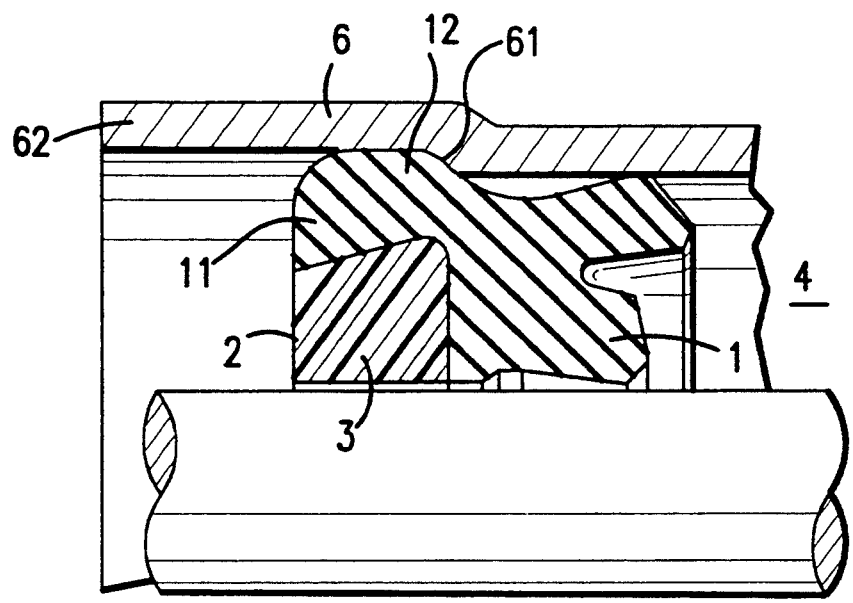
FIG. 3 shows the seal of FIG. 1 fully inserted between a housing and a rod.

FIG. 3 shows how the seal fits within the widened area following its insertion. The retaining section 11 is compressed between the essentially inflexible guide ring 3 and the essentially inflexible housing 6. The retaining section 11 is provided with an annular projection or shoulder 12, which extends outwardly in a radial direction. This projection 12 contacts a shoulder 61 of the housing 6 to limit movement in the axial direction, thus preventing further displacement of the seal in the direction of the medium 4 to be sealed.

Figure 4:
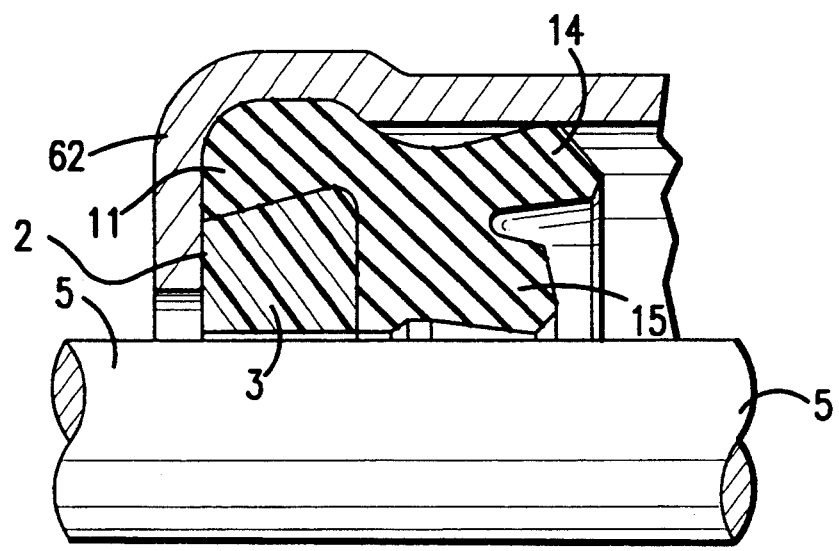
FIG. 4 shows the seal of FIG. 1 in its operating position between a housing and a rod.

An end 62 of the housing 6 that extends beyond the end 2 of the sealing ring 1 is folded over to the inside, as shown in FIG. 4. The end 62 can be reshaped, for instance, in a flanging or rolling process. The reshaping process is continued until the end 62 is pressed firmly against the end 2 of the retaining section 11 and the corresponding end of the guide ring 3.

The retaining section 11 and the guide ring 3 contact one another with tapered surfaces, which have conforming dimensions. The diameters of the corresponding tapered surfaces are larger in a direction away from the end 2. As a result, when the end 62 of the housing 6 is bent over, a sort of hydraulic effect is produced in the elastically deformable, but incompressible retaining section 11. As a result, the radial compression of the profile of the retaining section 11 between the inflexible guide ring 3 and the inflexible housing 6 is retained for a long time. .

The retaining section 11 of the sealing ring is joined to the remaining areas of the sealing ring through a contracted neck portion. Thus, the radial compression of the retaining section 11 does not adversely affect the radial mobility of sealing lips 14 and 15 to a significant degree. With this arrangement, an excellent sealing is attained, both with respect to the inner side of the housing 6, as well as with respect to the surface of the rod 5.

FIGS. 5 through 12 illustrate different embodiments of the seal according to the invention. Each is constructed according to the above described design principle, and each is able to be assembled in a similar fashion. It is a common feature of the designs that the guide ring 3 is undetachably secured to the sealing ring, as a result of being simply pressed or snapped into the recess of the sealing ring. When supplied to the user, the guide ring 3 is positioned in the sealing ring 1 so that the seal essentially has the same shape it has during normal operational use.

Figure 5:
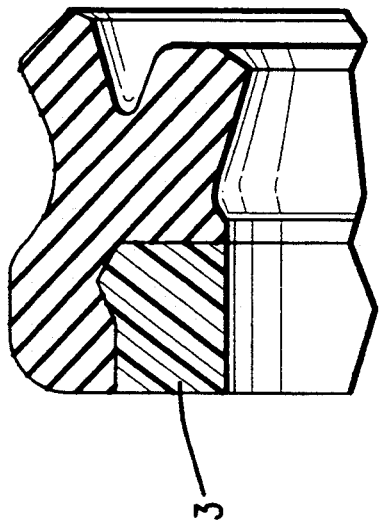
FIG. 5 shows a partial cross-sectional view of another embodiment of the seal according to the present invention.

In the embodiment of FIG. 5, the retaining section 11 and the guide ring 3 contact one another with tapered contact surfaces, whose angles of inclination become increasingly greater with increasing distance from the end 2.

Figure 6:
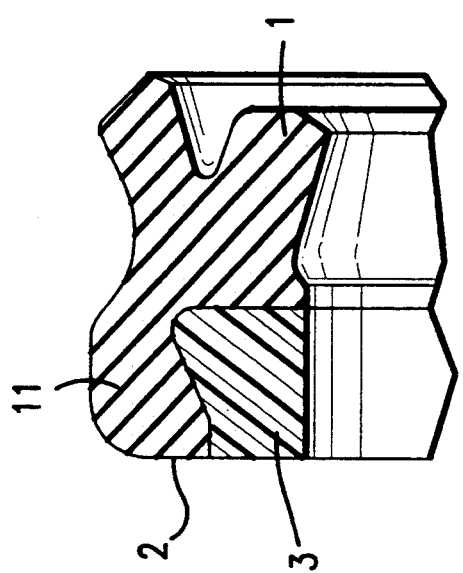
FIG. 6 shows a partial cross-sectional view of yet another embodiment of the seal according to the present invention.

In the design according to FIG. 6, the profile of the contact area between the guide ring 3 and the sealing ring 1 is divided into partial sections of different shapes. Adjoining a first, cylindrical partial area that is adjacent to the end 2 is a second partial area, which initially has a tapered shape, and eventually is rounded off to gradually merge into the opposite axial end of the guide ring 3.

Figure 7:
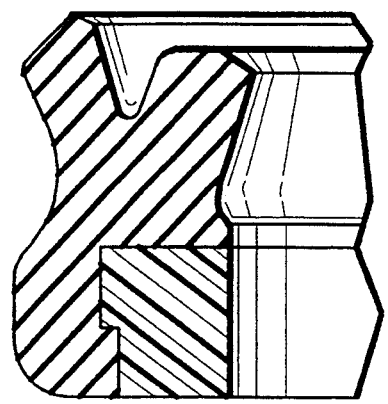
FIG. 7 shows a partial cross-sectional view of yet another embodiment of the seal according to the present invention.

In the embodiment of FIG. 7, adjoining a cylindrical area extending from the end 2 is a rounded-off area, which gradually merges into a first conical surface. This conical surface meets a second conical surface having an opposite direction of inclination, which ends at the opposite axial end of the guide ring 3.

Figure 8:
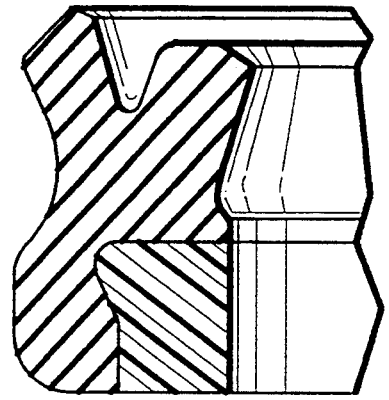
FIG. 8 shows a partial cross-sectional view of yet another embodiment of the seal according to the present invention.

In the design according to FIG. 8, the contact profile comprises two cylindrical partial areas whose diameters differ from one another.

Figure 9:
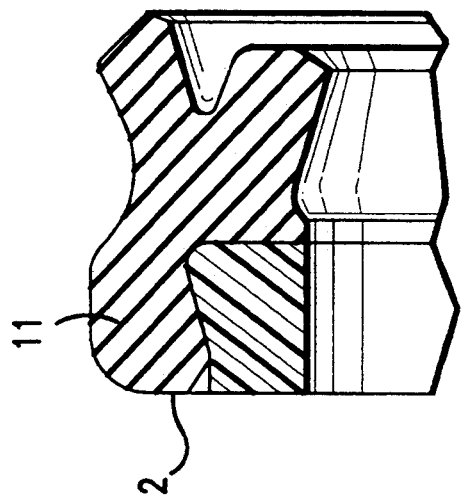
FIG. 9 shows a partial cross-sectional view of yet another embodiment of the seal according to the present invention.

The design according to FIG. 9 differs from the design according to FIG. 1 in that the retaining section 11 is chamfered on the inside in its area facing the end 2. This produces a small free space and allows an expansion region for the retaining section 11 following assembly (FIGS. 2 through 4). As a result, the seal is prevented from being excessively strained during assembly.

Figure 11:
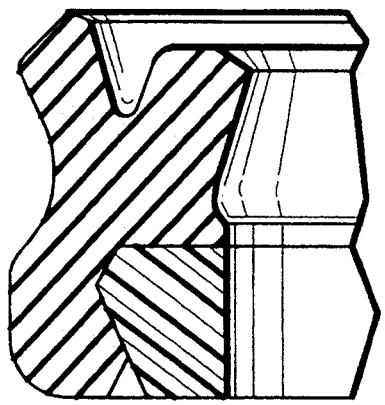
FIG. 11 shows a partial cross-sectional view of yet another embodiment of the seal according to the present invention.
Figure 10:
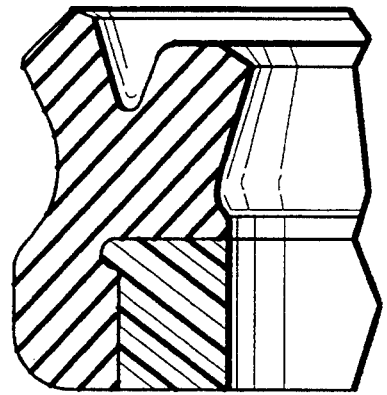
FIG. 10 shows a partial cross-sectional view of yet another embodiment of the seal according to the present invention.

FIGS. 10 and 11 show variants of FIGS. 6 and 7, which have been modified with a beveled opening in accordance with the design in FIG. 9.

Figure 12:
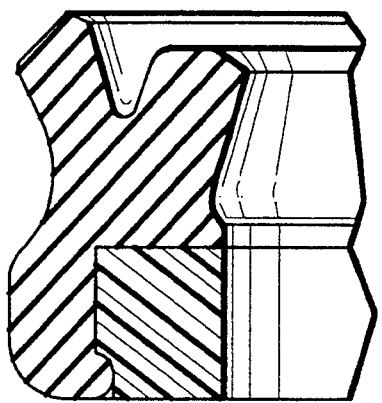
FIG. 12 shows a partial cross-sectional view of yet another embodiment of the seal according to the present invention.

In the embodiment of FIG. 12, the outside of the guide ring has two cylindrical surfaces. The cylindrical surface which is nearest to the end 2 has a comparatively smaller diameter and is rounded off at the area of transition to the larger cylindrical surface. A rounded bulb of the retaining section 11 projects radially inward and engages the recess formed by the transition surface of the guide ring.

Figure 13:
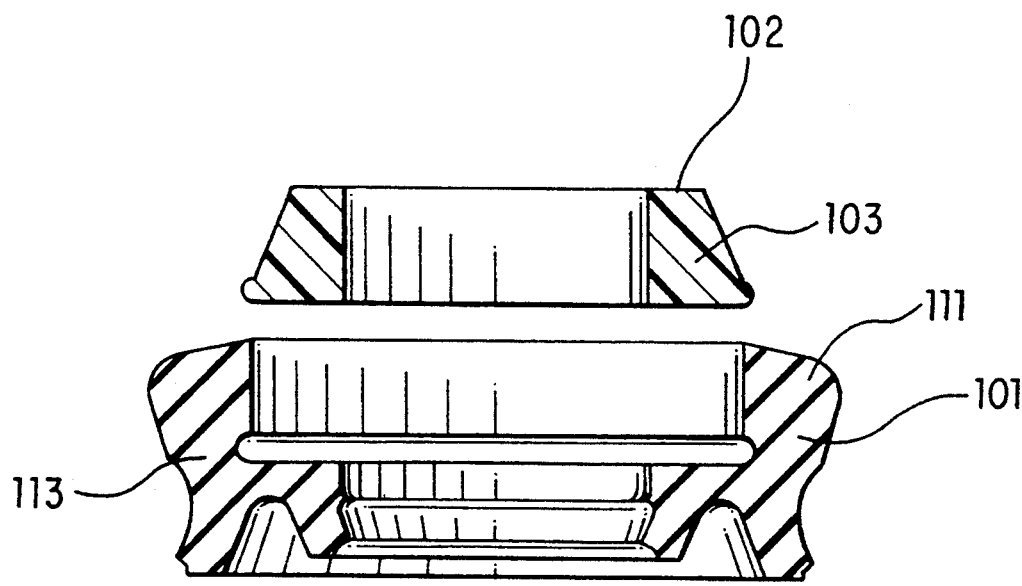
FIG. 13 shows another embodiment of the seal according to the present invention, with the guide ring not yet inserted into the sealing ring.

FIG. 13 shows in cross-section a further embodiment of the seal of the present invention, before the guide ring 103 is united with the sealing ring 101. The sealing ring 101 has two dynamically functioning sealing lips 115 as well as a static sealing lip 114, which projects outwardly in a radial direction.

Figure 14:
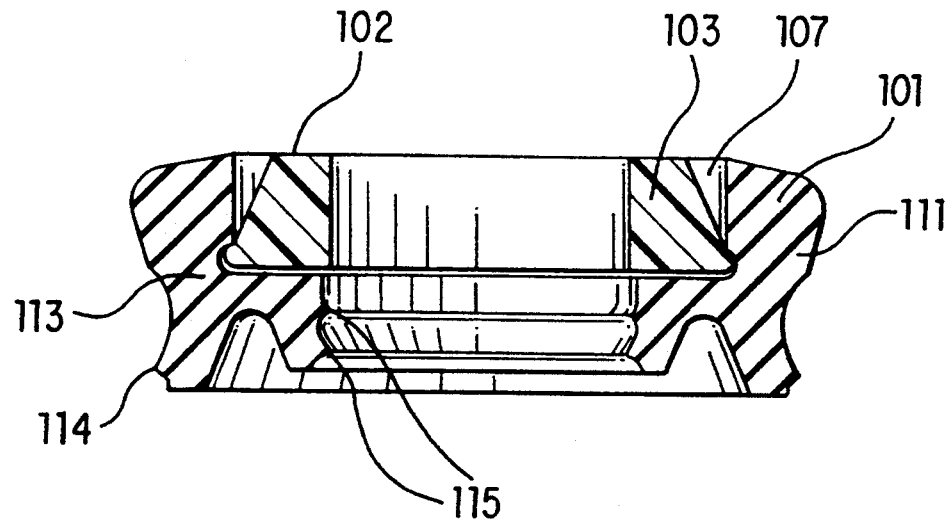
FIG. 14 shows the seal of FIG. 13, with the guide ring inserted into the sealing ring.

FIGS. 13 through 16 show the assembly of this alternative embodiment of the seal, in which the retaining section 111 and the guide ring 103 are dimensioned so as to produce a gap 107 between the two elements, near the end, in its nonoperating state. This is shown in FIG. 14.

FIG. 14 illustrates the seal according to FIG. 13 after the guide ring 103 has been inserted into the sealing ring 101. A gap 107 is illustrated between the two parts.

Figure 15:
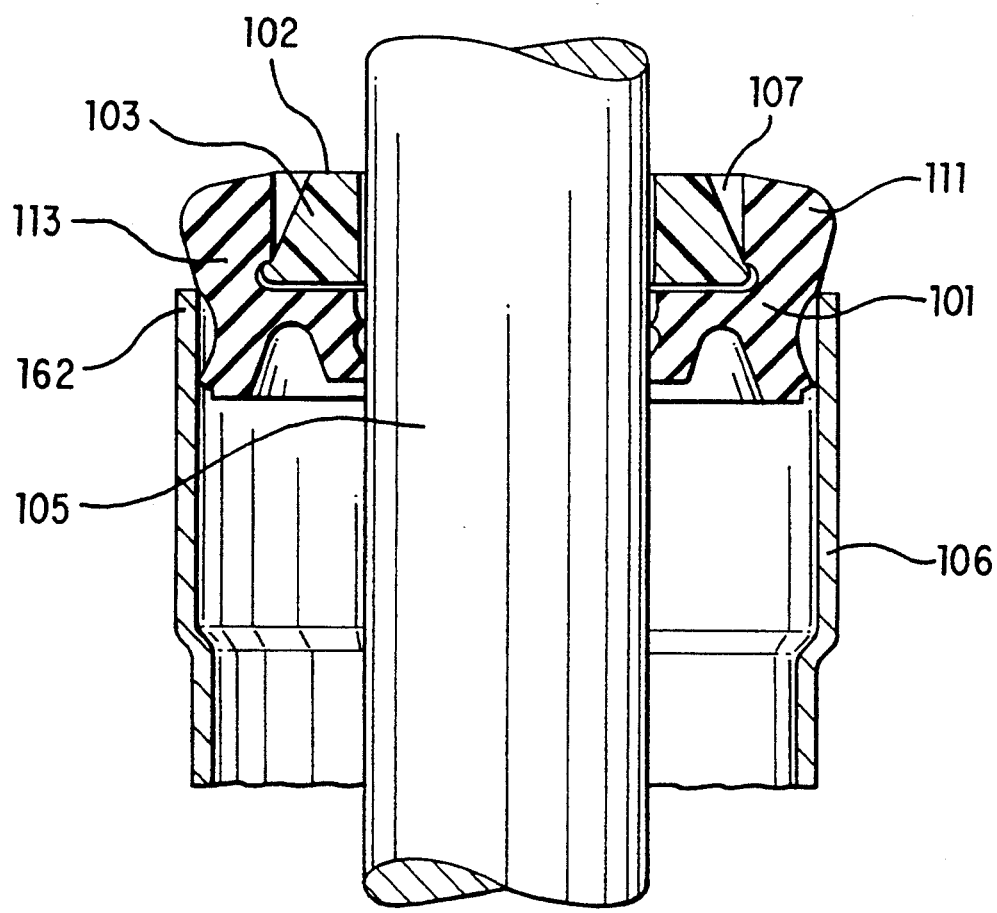
FIG. 15 shows the seal of FIG. 13 being inserted between a housing and a rod.
Figure 16:
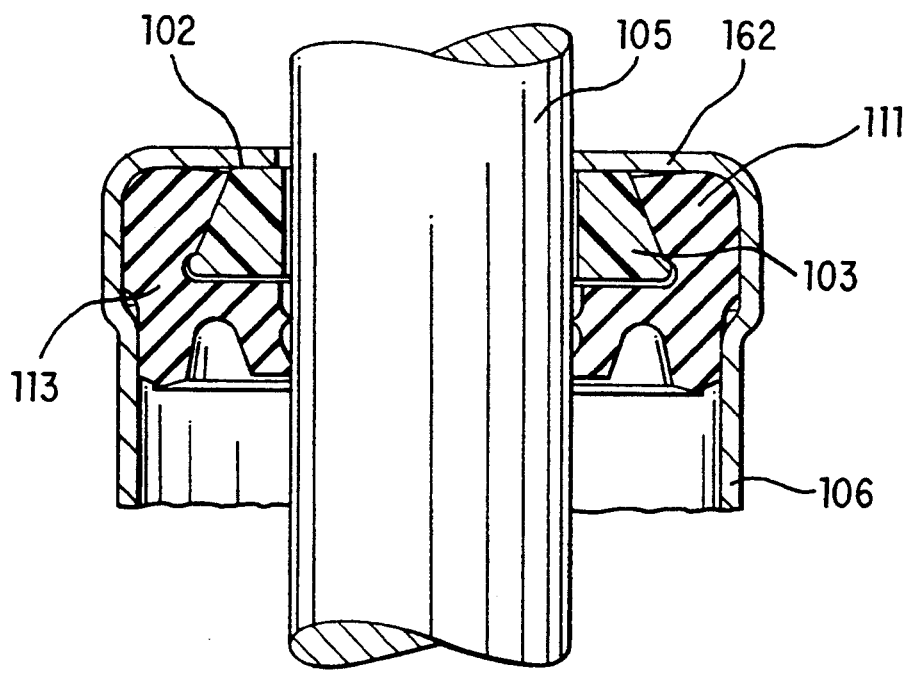
FIG. 16 shows the seal of FIG. 13 in an assembled state.

FIG. 15 shows the seal of FIG. 13 upon initial insertion between a housing 106 and a rod 105 which moves axially inside the housing. Upon insertion, the retaining section 111 is pressed inwardly by the housing so that it bends at intermediate area 113 and closes over the guide ring 103. The retaining section 111 rests continuously flat against the outside of the guide ring 103 and, on the other side, against the inside of the housing 106. The gap 107 which existed between the retaining section 111 and the guide ring 103 is closed.

Inward movement of the seal is limited by a shoulder of the housing 106. After the seal is inserted, the end 162 of the housing 106 which projects beyond the seal is folded over until it rests against the end 102. This produces a good sealing action and secures the seal against movement.

Different variations of seals are shown in FIGS. 17 through 20, in which, similarly to the embodiment of FIG. 13, a gap is initially present between the retaining section 211 and the guide ring 203 in the area of the end 202. The gap formation can be a consequence of an oversized guide ring 203.

Figure 17:
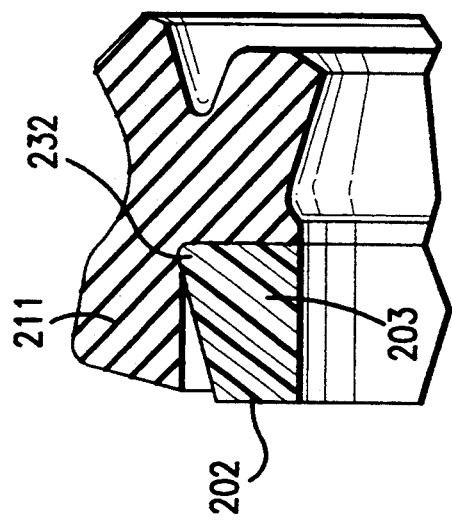
FIG. 17 shows yet another embodiment of the seal according to the present invention.

In the embodiment according to FIG. 17, the recess in the retaining section 211 for accommodating the guide ring is formed by a cylindrical surface, and the outside of the guide ring is formed by a conical surface. An annular extension 232 of the guide ring has a rounded shape. The extension projects radially and engages a groove of the retaining section 211.

Figure 18:
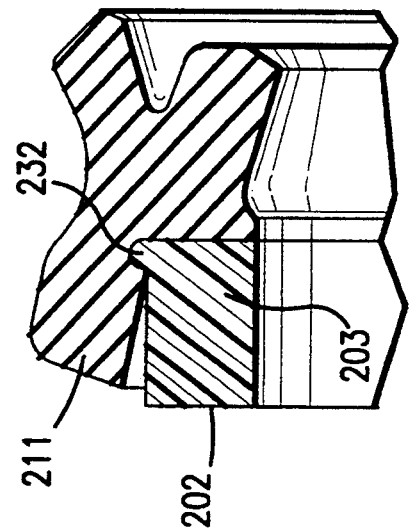
FIG. 18 shows yet another embodiment of the seal according to the present invention.

In the embodiment according to FIG. 18, the guide ring 203 is predominantly cylindrical, and the recess in the retaining section 211 is formed by a conical surface, which has an inside diameter that decreases with increasing distance from the end 202. The guide ring has an annular extension 232 with a rounded shape.

Figure 19:
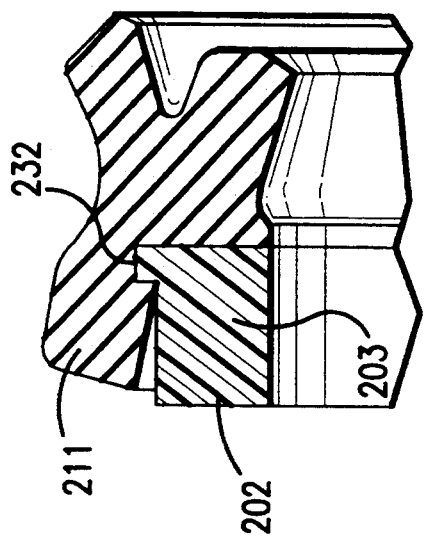
FIG. 19 shows yet another embodiment of the seal according to the present invention.

In the embodiment according to FIG. 19, the guide ring has a cylindrical surface over most of its axial length in the area nearest to the end 202; the retaining section 211 has a conical surface on the inside. An annular extension 232 has a rectangular shape.

Figure 20:
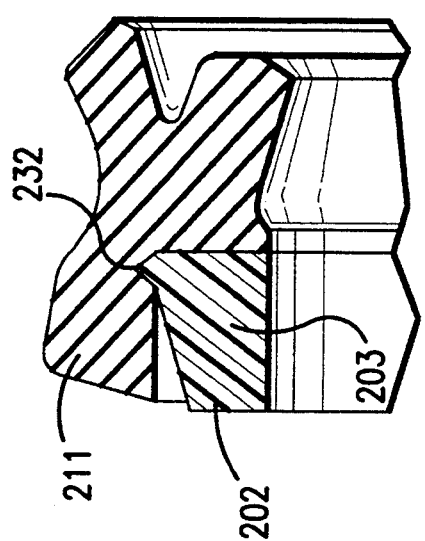
FIG. 20 shows yet another embodiment of the seal according to the present invention.

In the embodiment according to FIG. 20, the recess of the retaining section is formed as a conical surface; the guide ring has a conical surface, which exhibits an increasing diameter with increasing distance from the end. An annular extension 232 has a wedge shape.

We claim:

1. A seal for sealing a gap between a reciprocating rod and a housing, wherein the seal comprises a sealing ring of elastomeric material and a guide ring of a polymer material, wherein the guide ring comprises at least one radially outwardly pointing projection whereby said projection is able to be snapped into place in a recess of the sealing ring, and wherein the sealing ring comprises a first section, a second section, and an intermediate contracted portion, wherein the first section comprises a retaining section which is compressed radially during normal operational use in a space between the guide ring and the housing, the second section comprises at least one sealing lip, and the intermediate contracted portion comprises a contracted neck portion between said first section and said second section, wherein the contacted neck portion has a radial outward extent less than a radial outward extent of the retaining section and wherein the contracted neck portion forms a flexible hinge between said first section and said second section.

2. The seal according to claim 1, wherein the retaining section comprises an annular projection that extends radially outwardly of the rest of the sealing ring.

3. The seal according to claim 2, wherein the annular projection of the retaining section engages a shoulder in the housing.

4. The seal according to claim 3, wherein a flange projection of the housing retains the sealing ring and the guide ring.

5. The seal according to claim 4, wherein in the flange projection comprises a bent portion of the housing.

6. The seal according to claim 1, wherein the diameter of the radially outwardly pointing projection of the guide ring increases uniformly with increasing distance from an end of the seal.

7. The seal according to claim 1, wherein the retaining section covers most of an axial length of the guide ring.

8. The seal according to claim 1, wherein the retaining section has a beveled opening for receiving the guide ring.

9. The seal according to claim 1, wherein the sealing ring and guide ring have constructions such that when the guide ring is inserted in the sealing ring a gap exists between the guide ring and sealing ring and wherein when the guide ring and sealing ring are inserted in said housing, the gap between the sealing ring and guide ring is closed.

* * * * *